United States Patent
Bemetz et al.

(10) Patent No.: US 10,647,323 B2
(45) Date of Patent: May 12, 2020

(54) METHOD FOR OPERATING A MOTOR VEHICLE BY CREEP MODE OF THE CLUTCH

(71) Applicant: ZF Friedrichshafen AG, Friedrichshafen (DE)

(72) Inventors: Stefan Bemetz, Wangen im Allgä (DE); Roland Mair, Tettnang (DE); Achim Chiandetti, Friedrichshafen (DE); Thomas Jäger, Meckenbeuren (DE)

(73) Assignee: ZF FRIEDRICHSHAFEN AG, Friedrichshafen (DE)

(*) Notice: Subject to any disclaimer, the term of this patent is extended or adjusted under 35 U.S.C. 154(b) by 43 days.

(21) Appl. No.: 16/064,122

(22) PCT Filed: Nov. 22, 2016

(86) PCT No.: PCT/EP2016/078452
§ 371 (c)(1),
(2) Date: Jun. 20, 2018

(87) PCT Pub. No.: WO2017/108309
PCT Pub. Date: Jun. 29, 2017

(65) Prior Publication Data
US 2018/0370534 A1     Dec. 27, 2018

(30) Foreign Application Priority Data

Dec. 21, 2015 (DE) .......... 10 2015 226 134

(51) Int. Cl.
*B60W 10/02* (2006.01)
*B60W 30/18* (2012.01)
(Continued)

(52) U.S. Cl.
CPC ......... *B60W 30/18063* (2013.01); *B60K 6/48* (2013.01); *B60W 10/02* (2013.01);
(Continued)

(58) Field of Classification Search
None
See application file for complete search history.

(56) References Cited

U.S. PATENT DOCUMENTS 5,700,227 A * 12/1997 Kosik .......... B60W 10/02
                                            192/12 R
6,086,508 A * 7/2000 Kosik .......... B60W 10/02
                                            477/171
(Continued)

FOREIGN PATENT DOCUMENTS

DE   10 2006 037 836 A1   3/2007
DE   10 2009 001 293 A1   9/2010
(Continued)

OTHER PUBLICATIONS

German Search Report Corresponding to 10 2015 226 130.1 dated Sep. 20, 2016.
(Continued)

*Primary Examiner* — Dirk Wright
(74) *Attorney, Agent, or Firm* — Davis & Bujold PLLC; Michael J. Bujold

(57) ABSTRACT

A method of controlling a creep mode of a motor vehicle with a drive train having a drive unit (1), a gear mechanism (2) and a friction clutch (4) arranged between the drive unit (1) and the gear mechanism (2). The creep function, for controlling the creep mode, having a first partial function for controlling the creep mode, in a case of an activated brake pedal (15), and a second partial function for controlling a creep mode, in a case of a non-activated brake pedal (15). The first partial function of the creep function is only activated once the second partial function of the creep function is activated.

9 Claims, 6 Drawing Sheets

(51) Int. Cl.
  *B60K 6/48* (2007.10)
  *B60W 10/06* (2006.01)
  *B60W 20/00* (2016.01)

(52) U.S. Cl.
  CPC ............ *B60W 10/06* (2013.01); *B60W 20/00* (2013.01); *B60W 30/18027* (2013.01); *B60W 2540/10* (2013.01); *B60W 2540/12* (2013.01); *B60W 2710/083* (2013.01)

(56) References Cited

U.S. PATENT DOCUMENTS

| | | | | |
|---|---|---|---|---|
| RE37,572 E | * | 3/2002 | Kremmling | B60W 30/18063 477/74 |
| 6,358,182 B1 | * | 3/2002 | Eguchi | B60K 6/543 477/171 |
| 7,909,730 B2 | * | 3/2011 | Schwarz | B60W 30/18063 477/93 |
| 7,957,856 B2 | * | 6/2011 | Itoh | B60K 6/445 701/22 |
| 8,007,057 B2 | * | 8/2011 | Niessen | F16D 48/06 303/191 |
| 8,360,933 B2 | * | 1/2013 | Kaltenbach | B60W 10/04 477/185 |
| 8,439,795 B2 | * | 5/2013 | Miyamoto | B60W 10/08 477/27 |
| 8,972,128 B2 | * | 3/2015 | Lochocki, Jr. | B60W 10/10 701/53 |
| 9,248,758 B2 | * | 2/2016 | Yamazaki | B60W 30/181 |
| 9,308,831 B2 | * | 4/2016 | Monsere | B60L 15/2045 |
| 9,315,186 B1 | * | 4/2016 | Huh | B60W 20/00 |
| 9,327,721 B2 | * | 5/2016 | Johri | F02N 5/04 |
| 9,499,154 B2 | * | 11/2016 | Marfatia | B60W 10/06 |
| 9,517,770 B2 | * | 12/2016 | Yu | B60T 7/122 |
| 9,758,148 B2 | * | 9/2017 | Takahashi | B60W 30/18063 |
| 9,862,370 B2 | * | 1/2018 | Sasaki | B60W 10/18 |
| 9,873,432 B2 | * | 1/2018 | Naito | B60W 30/18063 |
| 10,118,620 B2 | * | 11/2018 | Park | B60W 10/08 |
| 2017/0113700 A1 | * | 4/2017 | Kaneko | B60W 50/06 |

FOREIGN PATENT DOCUMENTS

| | | |
|---|---|---|
| DE | 10 2009 001 295 A1 | 9/2010 |
| DE | 10 2009 053 294 A1 | 5/2011 |
| DE | 10 2013 207 095 A1 | 10/2013 |
| DE | 10 2012 015 872 A1 | 5/2014 |
| DE | 10 2015 110 800 A1 | 1/2016 |
| DE | 10 2015 111 100 A1 | 1/2016 |
| EP | 0 375 162 A2 | 6/1990 |

OTHER PUBLICATIONS

International Search Report Corresponding to PCT/EP2016/078439 dated Feb. 3, 2017.
Written Opinion Corresponding to PCT/EP2016/078439 dated Feb. 3, 2017.
German Search Report Corresponding to 10 2015 226 134.4 dated Sep. 20, 2016.
International Search Report Corresponding to PCT/EP2016/078452 dated Feb. 1, 2017.
Written Opinion Corresponding to PCT/EP2016/078452 dated Feb. 1, 2017.

* cited by examiner

METHOD FOR OPERATING A MOTOR VEHICLE BY CREEP MODE OF THE CLUTCH

This application is a National Stage completion of PCT/EP2016/078452 filed Nov. 22, 2016, which claims priority from German patent application serial no. 10 2015 226 134.4 filed Dec. 21, 2015.

FIELD OF THE INVENTION

The invention relates to a method for controlling a creep mode of a motor vehicle. The invention furthermore relates to a control device, which is designed to carry out the method as well as a corresponding computer program product.

BACKGROUND OF THE INVENTION

In motor vehicles with automated manual transmissions it is known to provide a creep function, which serves to control a motor vehicle in a creep mode, in which the motor vehicle realizes a creeping movement at a low vehicle speed. The creep mode advantageously permits easy parking or start-up of the motor vehicle.

For this purpose, in the activated creep function a creep torque is transferred via a friction clutch arranged between a drive unit and an automated manual transmission, which creep torque is dimensioned such that the motor vehicle can realize only a creeping movement at a low speed and not normal travel movement. The creeping of the vehicle can, depending on the engaged gear, take place both in a forwards driving direction and in a reverse driving direction and can assist the driver with start-up or maneuvering the vehicle.

Document EP 0 375 162 B1 made known a vehicle clutch control system, in which automated control of the vehicle clutch takes place in a creeping phase of the motor vehicle. In the creeping phase the control of the vehicle clutch takes place with an engaged starting gear and a non-activated accelerator pedal dependent on brake pedal activation, with the vehicle clutch being further closed when the brake pedal is further released.

SUMMARY OF THE INVENTION

In view of the above-described prior art, the problem now addressed by the present invention is to provide an improved method for controlling a creep mode of a motor vehicle, which permits sensitive driving at a low vehicle speed and with low clutch wear. In addition a corresponding control device, which is designed to realize the method and a computer program product for realizing the method are to be disclosed.

From the method perspective, a solution to this problem is provided based on the preamble of the independent claims in conjunction with their characterizing features. A control device to control a creep mode of a motor vehicle is also the subject of the independent claims. With regards to a computer program product, reference is made to the independent claims. Advantageous further developments are the subject of the dependent claims and of the description below.

A method is proposed for controlling a creep mode of a motor vehicle with a drive train comprising a drive unit, a gear mechanism and a friction clutch arranged between the drive unit and the gear mechanism, in which a creep function for controlling the creep mode comprises a first partial function for controlling the creep mode in the case of an activated brake pedal and a second partial function for controlling the creep mode in the case of a non-activated brake pedal.

The gear mechanism is preferably an automatic or automated gear mechanism, which can be designed for example as an automated step-by-step variable speed transmission, as an automatic transmission, as a dual clutch transmission, as a continuous variable transmission, etc. The gear mechanism can also be made up of several transmission groups, by the placement of a split group upstream or downstream of a main group, and/or downstream placement of a range group. The motor vehicle in which the method according to the invention is used is for example a commercial vehicle, such as a truck.

The drive unit can be a combustion engine, an electric motor or a hybrid drive, which then comprises both an electric motor and a combustion engine.

The creep function can be manually requested by a vehicle driver or can be automatically activated when the required conditions are met. A signal, which indicates a driver request for activation of the creep function can be generated by a vehicle driver for example by means of activating a switch or button.

The invention now comprises the technical teaching that the first partial function of the creep function can be activated only once the second partial function of the creep function is activated.

In other words, activation of the first partial function of the creep function, in which the control of the creep mode takes place with an activated brake pedal, requires an already activated second partial function of the creep function, in which the control of the creep mode takes place with a non-activated brake pedal.

In the case of controlling the creep mode with an activated brake pedal, a converter behavior known from an automatic transmission can be reproduced, however the friction clutch in such a creep mode is called upon more than in the case of control of the creep mode with a non-activated brake pedal. In driving situations, in which a creep mode with a non-activated brake pedal is sufficient, it is possible to do without a previously activated creep mode with an activated brake pedal. This procedure thus reduces the stress on the friction clutch operated in slippage and thus the clutch wear. However, in the method proposed in document EP 0 375 162 B1 the creep mode always begins with an activated brake pedal position, in other words, a converter behavior is reproduced even at the beginning of the creep mode.

The second partial function can then be activated when the conditions required for the creep mode of the motor vehicle exist. The required conditions may be for example at least one running drive unit, a gear engaged in the transmission and a non-activated accelerator pedal as well as a non-activated brake pedal. As a further condition it is possible to check for example whether a gear input rotational speed is less than an engine idle running rotational speed. The second partial function of the creep function can be manually requested by a vehicle driver or can be automatically activated when the required conditions exist, A signal, which indicates a driver request for activation of the creep function, can be generated by a vehicle driver for example by means of activation of a switch or button.

In the case of an activated creep function, the friction clutch is controlled such that a creep torque is transferred via the friction clutch which is large enough to overcome the driving resistance or the driving resistance torque acting on the motor vehicle. The driving resistance torque is obtained from the total of the motor vehicle driving resistances, such as rolling resistance, incline resistance and air resistance and can be obtained by back calculation taking into account the total gear ratio and the effect of the drive train on the gear input shaft or the friction clutch. The creep torque can thus be determined by calculation or from a characteristics map depending on the brake pedal position and the calculated or estimated driving resistance.

If, when the second partial function of the creep function is activated, the brake pedal is moved from a non-activated position to a position which lies between the non-activated position and a predetermined threshold value of the brake pedal position or of the braking pressure, then the second partial function is deactivated and the first partial function is activated. In the case of an activated first partial function it is envisaged that the creep torque transferred via the automated friction clutch is influenced by the activation of the brake pedal, as long as the current brake pedal position or the current braking pressure does not again exceed the predetermined threshold value. Thus in the case of an activation of the brake pedal in a range between the threshold value and a non-activated brake pedal position with an activation of the brake pedal in the direction of a non-activated brake pedal position the friction clutch is further closed, with the result that the creep torque transferred via the friction clutch is increased, while in the case of activation of the brake pedal in the direction of the threshold value the friction clutch is further opened, with the result that the creep torque transferred via the friction clutch is reduced. If the current brake pedal position or the current braking pressure reaches or exceeds the threshold value, then the creep function is deactivated, the friction clutch is fully opened and the motor vehicle is kept at a standstill due to the set braking pressure.

In an advantageous further development it can be envisaged that when the friction clutch has been closed by the first or the second partial function of the creep function to such an extent that it is in a locking state and neither the accelerator pedal nor the brake pedal is activated, the friction clutch is, after a predeterminable period of time, moved by a certain amount in the direction of closure and the drive unit is operated via an idling rotational speed regulation. The idling rotational speed regulation of the drive unit can for example be ended when a brake pedal activation or an accelerator pedal activation is detected, when a safety-critical driving operation is initiated or a maximum permissible motor load is reached or exceeded. In the case of a brake pedal activation a stopping function is activated, by means of which a full opening of the friction clutch is brought about. The creep function can then be activated again when the required conditions are met, otherwise the friction clutch remains open. In the case of an accelerator pedal activation however a normal driving mode is engaged and the friction clutch is fully closed. If a safety-critical driving mode is entered into or if a maximum permissible motor load is reached or exceeded, as in the case of the brake pedal activation a stopping function is activated, by means of which a full opening of the friction clutch is brought about. The creep function can subsequently be activated again when the required conditions are met, otherwise the friction clutch remains open.

The invention furthermore relates to a control device, which is designed to carry out the method according to the invention. The control device comprises means which serve to carry out the method according to the invention. These means are hardware type means and software type means. The hardware type means are data interfaces for exchanging data with the components of the drive train involved in carrying out the method according to the invention. The hardware type means of the control device are furthermore a processor for data processing and if appropriate a storage means for data storage. The software type means are program modules for carrying out the method according to the invention.

The control device for carrying out the method according to the invention thus comprises at least one reception interface, which is designed to receive at least a signal from an operating element, which indicates a driver's request for activation of the creep function, a signal from a rotational speed sensor, which indicates a state of the drive unit, a signal from a position sensor or path sensor, with which a gear engaged in the transmission is indicated, a signal from a position sensor or path sensor, with which a position or an activation of the accelerator pedal is detected and a signal from a position sensor or path sensor, with which a position or an activation of the brake pedal is detected. The control device additionally has an analysis unit, to analyze the received input signals or the information from the received input signals. Based on received input signals or the information from received input signals, the control device determines whether the creep function can be activated and is requested by the vehicle driver. If the creep function can be activated and the motor vehicle is to be operated in the creep mode, then the creep function is activated by the control device. By means of a sending interface the control device emits control signals to drive train components to operate the motor vehicle in the creep mode, with the control device only enabling a first partial function for controlling the creep mode in the case of an activated brake pedal when previously a second partial function for controlling the creep mode in the case of a non-activated brake pedal has been activated by the control device.

The control device can for example be designed as a central control apparatus or as a gear control apparatus. The above-mentioned signals are to be seen as examples only and should not limit the invention. The detected input signals and the emitted control signals can be transferred via a vehicle bus, for example via a CAN bus.

The solution according to the invention can also be in the form of a computer program product which, when run on a processor of a control device, guides the processor in the manner of software to carry out the assigned method steps which are the subject of the invention. In this respect, a computer-readable medium is also a subject of the invention, on which an above-described computer program product is stored in an accessible manner.

The invention is not limited to the specified combination of features of the coordinate independent claims or of the claims dependent thereon. There are furthermore opportunities to combine with one another individual features, also to the extent that they emerge from the claims, the following description of embodiments or directly from the drawings. The referencing of the claims to the drawings by the use of reference numerals should not limit the scope of protection) of the claims.

BRIEF DESCRIPTION OF THE DRAWINGS

The basic principle of the invention, which allows for multiple embodiments, shall be explained in detail below in an exemplary manner using drawings, in which.

DETAILED DESCRIPTION OF THE PREFERRED EMBODIMENTS

Figure 1:
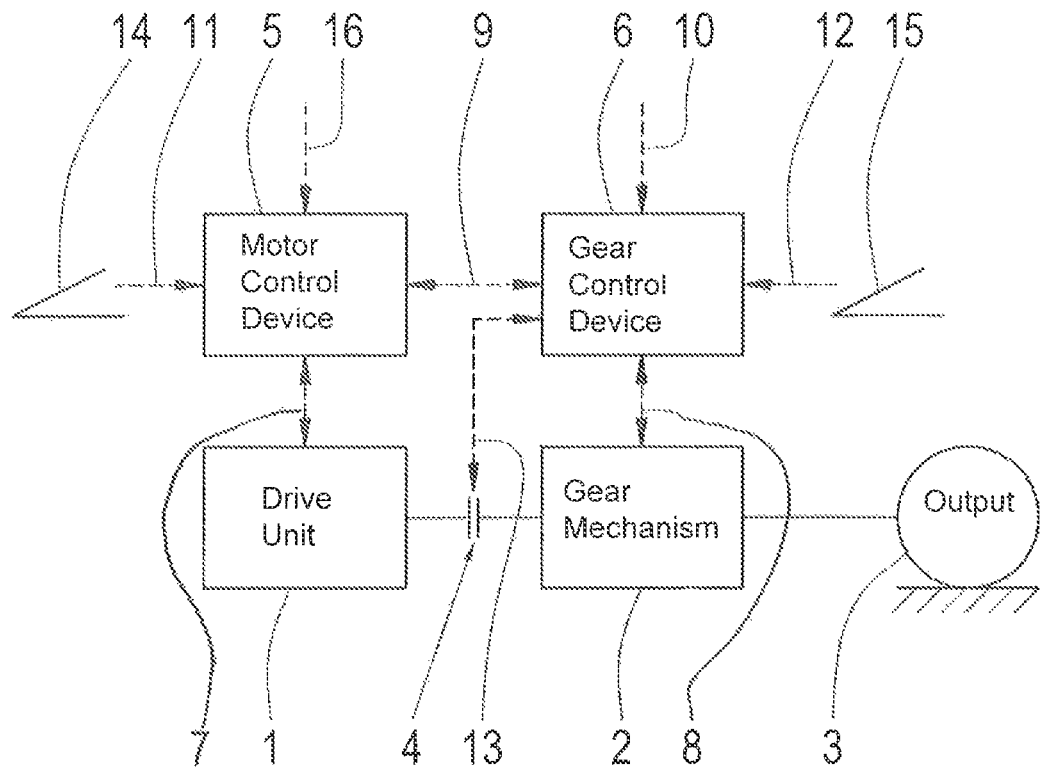
FIG. 1 shows a block diagram of a drive train with an automated shift gear box.

FIG. 1 shows a highly schematic depiction of a drive train of a motor vehicle, with the depicted drive train comprising a drive unit 1 and a gear mechanism 2, with the gear mechanism 2 being formed between the drive unit 1 and an output 3 of the drive train. The gear mechanism 2 is preferably formed as an automatic or automated shift gear box and converts rotational speeds and torques of the drive unit 1 and thus provides the tractive force of the drive unit 1 at the output 3. According to FIG. 1, a friction clutch 4 is introduced between the drive unit 1 and the gear mechanism 2, which is formed here as an automated shifting clutch or start-up clutch. A motor control device 5 is assigned to the drive unit 1 and a gear control device 6 is assigned to the gear mechanism 2. The operation of the drive unit 1 is controlled and/or regulated with the aid of the motor control device 5, for which purpose the drive unit 1 exchanges data 7 with the motor control device 5. The operation of the gear mechanism 2 is controlled and/or regulated by the gear control device 6, for which purpose the gear control device 6 exchanges data 8 with the gear mechanism 2. According to FIG. 1, the motor control device 5 and the gear control device 6 additionally exchange data 9 with one another. The operation of the friction clutch 4 is here likewise controlled and/or regulated by the gear control device 6, for which purpose the gear control device 6 exchanges data 13 with the friction clutch 4. Alternatively, the operation of the friction clutch 4 could be controlled and/or regulated by a clutch control device not depicted here, which can then exchange data with the friction clutch 4, the gear control device 6 and the motor control device 5.

In addition, the gear control device 6 is provided with data 12 about a position or an activation degree of a brake pedal 15 and the motor control device 5 is provided with data 11 about a position or an activation degree of an accelerator pedal or gas pedal 14. The position or the activation degree of the brake pedal 15 can be detected by means of a path sensor or position sensor arranged on the brake pedal 15 and the position or the activation degree of the accelerator pedal 14 can be detected by means of a path sensor or position sensor arranged on the accelerator pedal 14.

According to FIG. 1, the gear control device 6 is provided with data 10 by additional sensors not depicted here, on the basis of which the gear control device 6 controls and/or regulates the operation of the gear mechanism 2 and of the friction clutch 4. The motor control device 5 is also provided with data 16 by additional sensors not depicted here, on the basis of which the motor control device 5 controls and/or regulates the operation of the drive unit 1.

In the present case it is now provided that an activation of a first partial function of the creep function, in which the control of the creep mode occurs with an activated brake pedal, requires an already activated second partial function of the creep function, in which the control of the creep mode occurs with a non-activated brake pedal. By means of a control device, for example the gear control device 6, the method depicted in FIG. 3, FIG. 4 and FIG. 6 as a flow chart is carried out, which method will be addressed below with reference to the figures.

Figure 2:
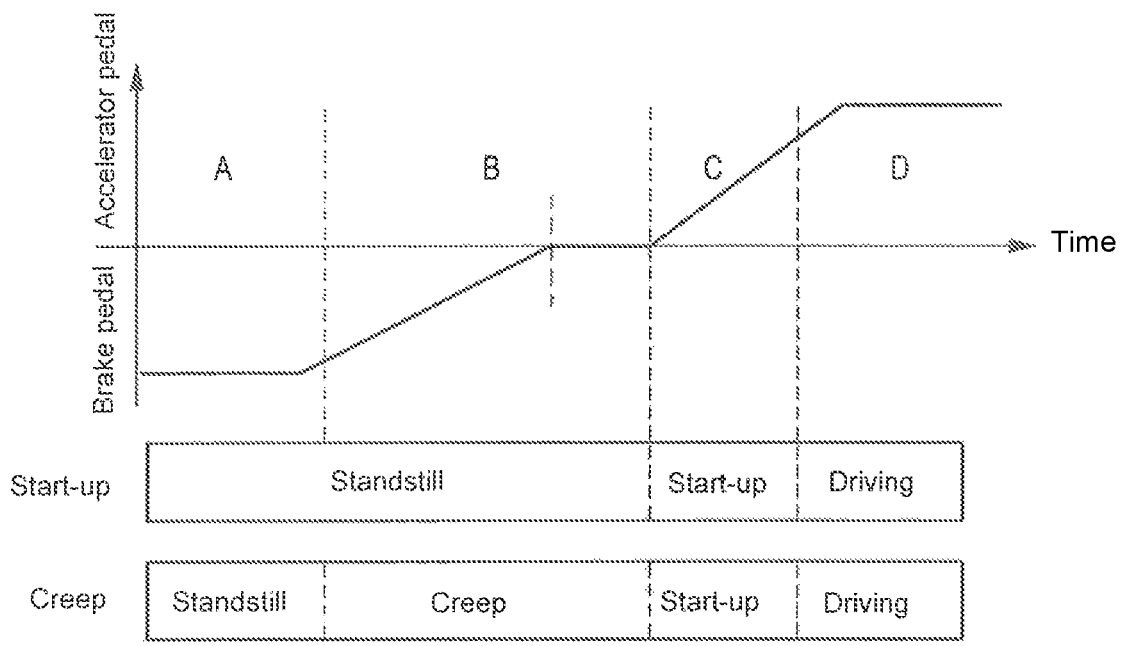
FIG. 2 shows a diagram, in which a brake pedal position and an accelerator pedal position are depicted over time.

It can be seen from the diagram shown in FIG. 2 that creeping of the motor vehicle by means of an activated creep function and a start-up of the motor vehicle by means of an activated start-up function are not mutually exclusive. Instead FIG. 2 shows that the creeping precedes the start-up and starts the motor vehicle moving earlier. In the region A the brake pedal 15 is fully or almost fully depressed by the vehicle driver and the friction clutch 4 is fully opened, so that both in the start-up function and in the creep function no drive torque is transferred via the friction clutch 4 and the motor vehicle is kept at a standstill. In the region B the vehicle driver slowly releases the brake pedal 15. In the case of an activated start-up function the friction clutch 4 remains open and the motor vehicle is still kept at a standstill. The creep function for controlling the creep mode of the motor vehicle comprises a first partial function for controlling the creep mode in the case of an activated brake pedal 15 and a second partial function for controlling the creep mode in the case of a non-activated brake pedal 15. In the case of an activated creep function, the friction clutch 4 is already partially closed in region B, in other words operated in a clutch slip. The motor vehicle already starts to move in this region when the clutch torque transferred via the friction clutch 4 exceeds the driving resistance or the driving resistance torque. According to the invention it is now provided that an activation of the first partial function of the creep function, in which the control of the creep mode takes place with an activated brake pedal 15, requires an already activated second partial function of the creep function, in which the control of the creep mode takes place with a non-activated brake pedal 15. In the region C the vehicle driver signals through the activation of the accelerator pedal 14 a start-up desire, at which point the start-up function becomes active. In the case of an active start-up function, depending on the accelerator pedal position the friction clutch 4 is positioned further in the direction of "closed" and the speed or the torque of the drive unit 1 is increased, with the result that the motor vehicle is accelerated. Once the start-up of the motor vehicle is realized the friction clutch 4 is finally fully closed and the motor vehicle is operated with a corresponding driving program.

Figure 3:
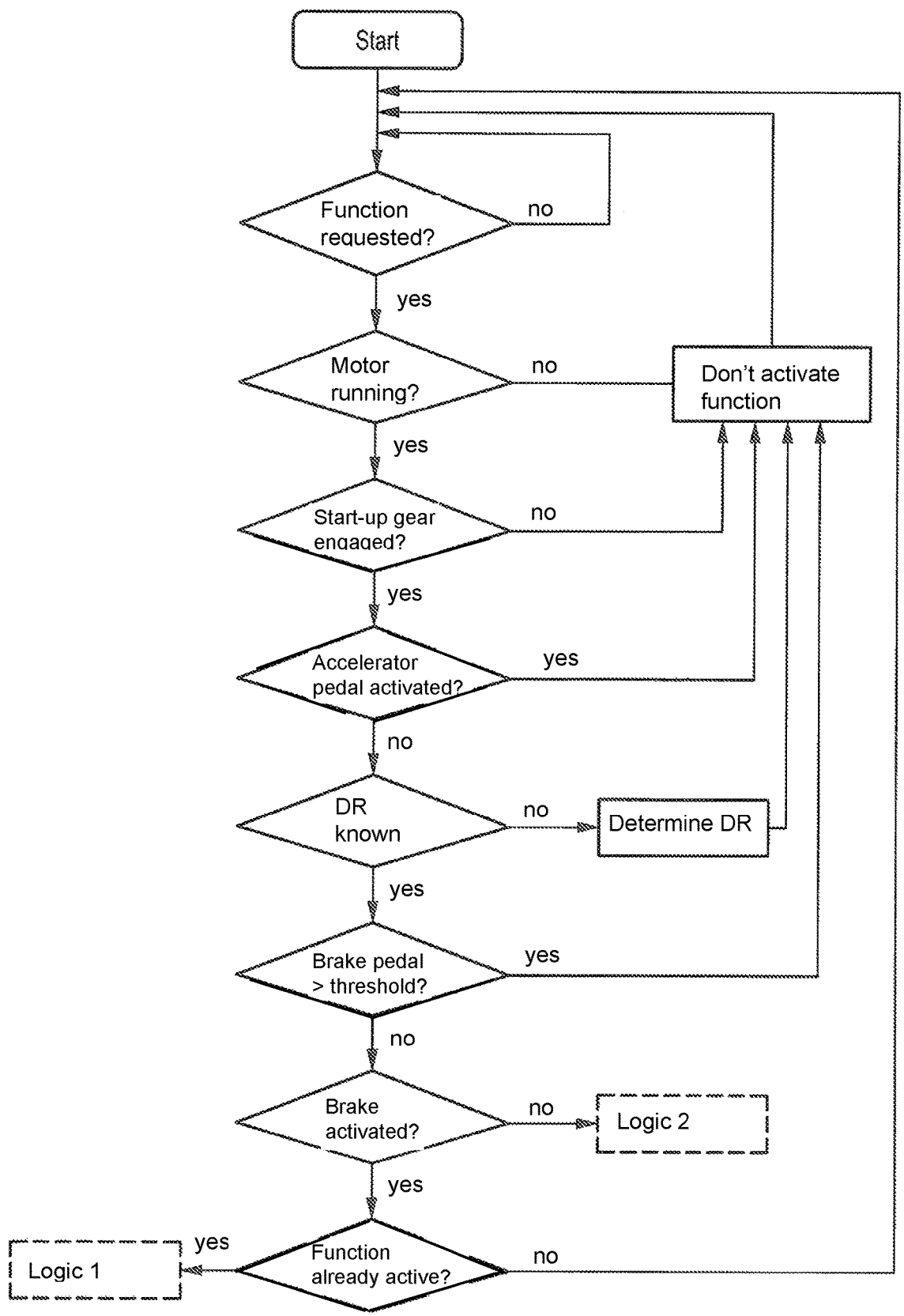
FIG. 3 shows a first flow chart for controlling a creep mode of a motor vehicle.

According to FIG. 3, the motor vehicle is at a standstill or is rolling at a low speed at the start of the method. In a first step it is checked whether the creep function is requested by a vehicle driver. The vehicle driver can request the creep function for example by means of activation of a switch or button or via a menu setting of an on-board computer. If it is registered that the creep function is requested, then a further method step checks whether the drive unit 1 is running. If a stopped drive unit is detected, then the creep function is not activated. In the case of a running drive unit 1 it is checked as a further condition for activation of the creep function whether a start-up gear is engaged in the gear mechanism 2. If the gear mechanism 2 is in a neutral position, then the creep function is not activated, whereas in the case of an engaged start-up gear in a further method step the position of the accelerator pedal 14 is checked. If the accelerator pedal 14 is activated, the activation of the creep function is prevented, as an activated accelerator pedal 14 is assessed as a start-up desire of the vehicle driver. However, if it is determined that the accelerator pedal 14 is not activated, it is then checked in a further method step whether a current driving resistance (DR) is established. If the driving resistance is not established, then the creep function is not initially activated and the driving resistance (DR) is determined by means of methods which are well known to the person skilled in the art. Because the air resistance is negligible due to the vehicle standstill or the low vehicle speed, the driving resistance can be obtained from the total of the rolling resistance and the incline resistance taking into account the vehicle mass.

In a further method step it is checked whether a current position of the brake pedal 15 starting from a fully depressed brake pedal 15 has reached or has fallen short of a predetermined threshold value. The creep function is not activated when, starting from a fully depressed brake pedal 15, the threshold value is not reached or is not fallen short of, in other words the brake pedal 15 is activated in a range between a fully depressed brake pedal 15 and the threshold value.

If however the brake pedal 15 is positioned to such an extent in the direction of "not activated" that the threshold value is fallen short of, it is then checked in a further method step whether the brake pedal 15 is still activated. If the check finds that the brake pedal 15 is not activated, then the second partial function of the creep function "logic 2" is activated. This second partial function of the creep function will be explained in greater detail later with reference to FIG. 6. If however it is determined that the brake pedal is activated in a range between a non-activated position and the threshold, there is a further check of whether the first or the second partial function of the creep function is already active. If neither the first nor the second partial function of the creep function is active, the first partial function of the creep function "logic 1" is not available and the method is recommenced.

A first activation of the first partial function of the creep function "logic 1" thus requires that the second partial function of the creep function "logic 2" is already activated, in other words the brake pedal 15 has initially been moved to a non-activated position. Thus the release of the brake pedal 15 from the fully depressed position does not lead to the activation of the first partial function of the creep function. Only once the brake pedal 15 is pressed down or activated from its non-activated position does this lead to the first activation of the first partial function. A control of the creep operation in the case of an activated brake pedal 15 to reproduce a converter behavior known from an automatic transmission can thus only take place starting from an initially fully released brake pedal 15.

Figure 4:
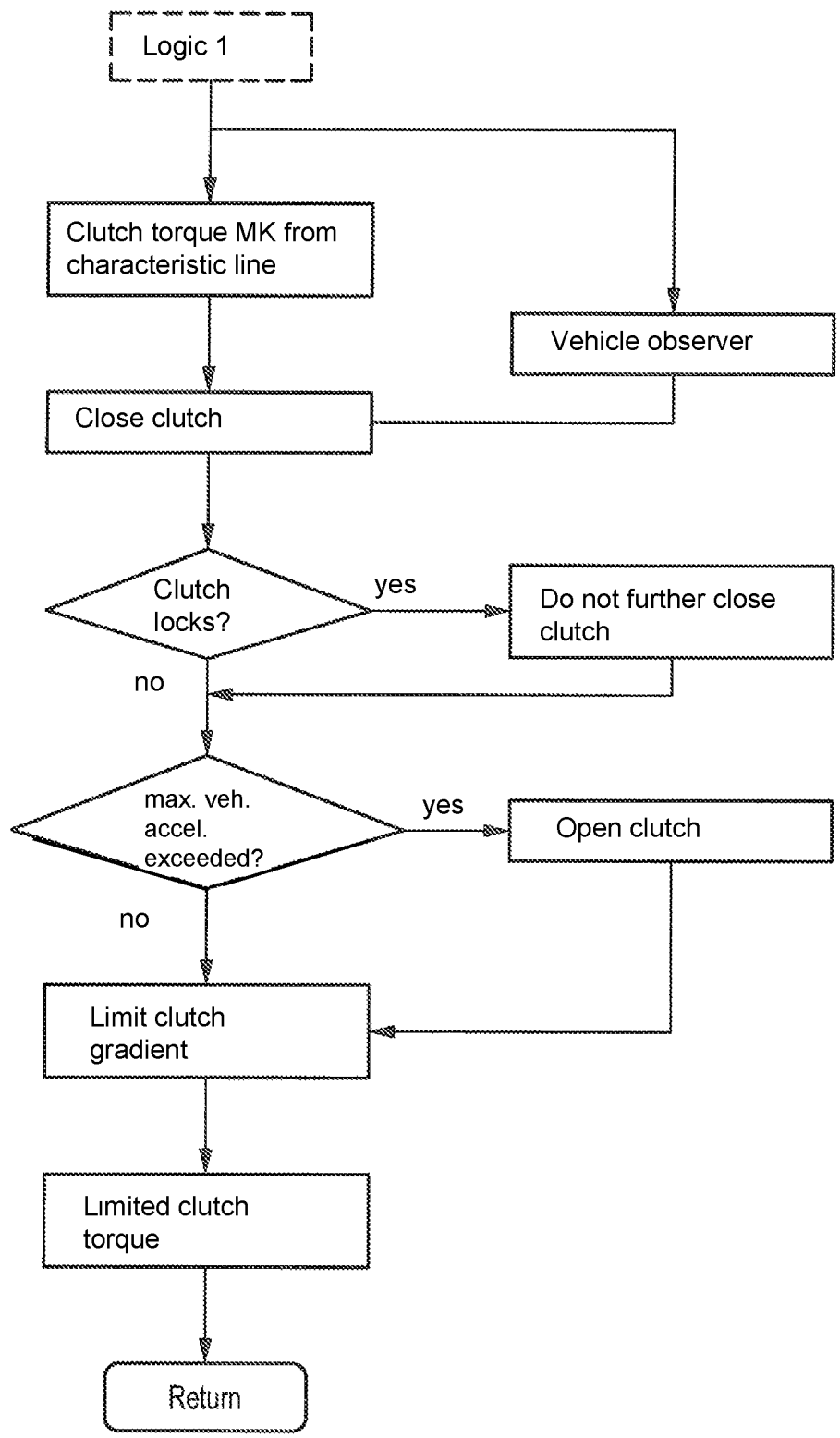
FIG. 4 shows a second flow chart for controlling a creep mode of a motor vehicle.

With reference to FIG. 4 the first partial function of the creep function shah now be explained in detail. If the first partial function of the creep function has been activated as described above, firstly a clutch torque (MK) depending on the brake pedal activation and the current driving resistance is determined from a characteristics map and the friction clutch 4 is closed to the extent that the determined clutch torque is transferred. Parallel hereto the vehicle performance is observed. When the motor vehicle starts moving too soon, in other words a too high clutch torque is transferred via the friction clutch, the clutch torque determined from the characteristics map is correspondingly reduced. If the motor vehicle is however still at a standstill in the set brake pedal position, then the clutch torque determined from the characteristics map is correspondingly increased. In a further method step it is checked whether the friction clutch 4 is locking. A locking friction clutch 4 can be determined from the gear input shaft rotational speed corresponding to the rotational speed of the drive unit 1. If the friction clutch 4 locks, then the friction clutch 4 is not closed further, as this closure would then make no change to the then existing vehicle behavior. If however the friction clutch 4 is still in the slip, then it is checked whether a current vehicle acceleration exceeds a maximum permissible vehicle acceleration. If the maximum permissible vehicle acceleration is exceeded this indicates that too high a clutch torque is transferred via the friction clutch 4. In this case the current vehicle acceleration is decreased by means of slow opening of the friction clutch 4.

If however the current vehicle acceleration is within a permitted acceleration range, it is furthermore envisaged to limit both a clutch torque gradient and the clutch torque transferred via the friction clutch 4 to provided omit values. This is necessary because the friction clutch 4 can be operated only in a limited range during the creep mode in order to limit the load on the friction clutch 4 and thus the clutch wear.

Figure 5:
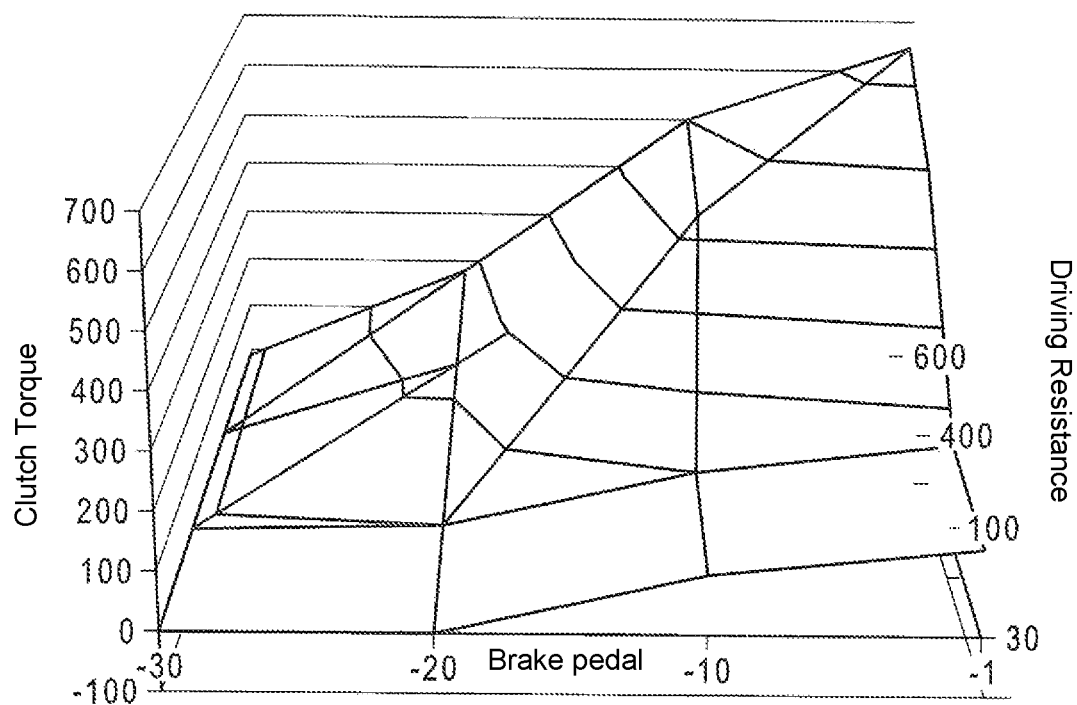
FIG. 5 shows a characteristic map for determining a clutch torque depending on a brake pedal activation and a driving resistance.

A characteristics map for determining the clutch torque depending on a brake pedal activation and a current driving resistance is depicted in FIG. 5. The brake pedal values are shown as negative numbers here, and in the case of a brake pedal value of −30 the brake pedal 15 is further depressed, in other words a braking pressure or a braking force is greater than in the case of a brake pedal value of for example −10. If the vehicle driver releases the brake pedal 15 for example starting from the brake pedal value −30, then a change occurs from a characteristic line value on the left in the diagram to a characteristic line value on the right in the diagram, with the friction clutch 4 being activated in the direction of "close". If the vehicle driver then activates the brake pedal 15 more intensely again, then the friction clutch 4 is again activated in the direction of "open" and a small clutch torque is transferred. The brake pedal 15 thereby acts essentially simultaneously as a brake pedal and as a clutch pedal and in an advantageous manner the converter behavior known from an automatic transmission can be reproduced.

Figure 6:
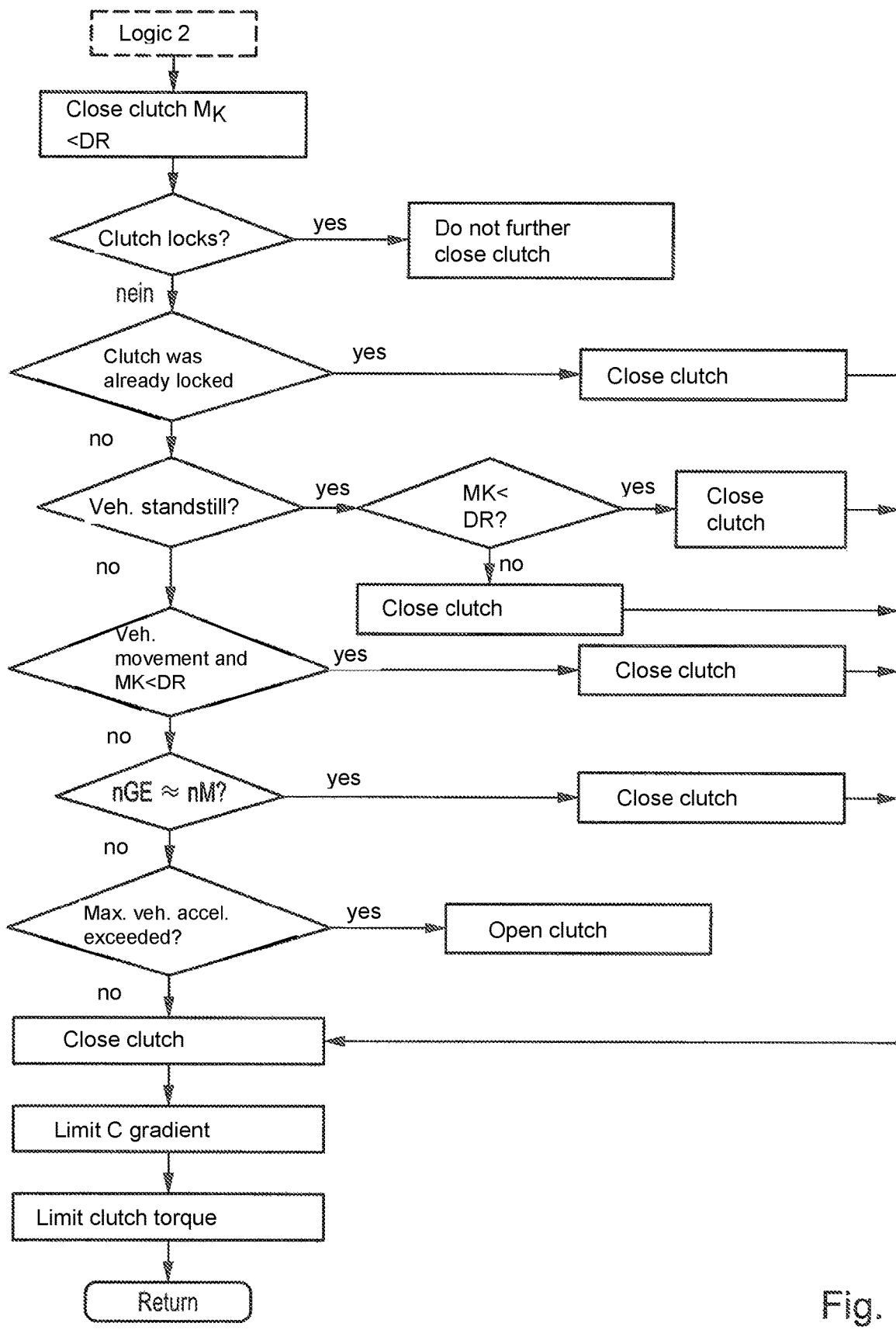
FIG. 6 shows a third flow chart for control of a creep mode of a motor vehicle.

With reference to FIG. 6 the second partial function of the creep function shall now be explained in detail. If the second partial function for controlling the creep mode in the case of a non-activated brake pedal 15 has been activated as described above, then the friction clutch 4 is initially closed to such an extent that clutch torque is transferred via the friction clutch 4, which is below the calculated clutch torque, which is necessary for overcoming the driving resistance or the driving resistance torque. Because the driving resistance or the driving resistance torque cannot be precisely determined by means of a calculation or estimation, this prevents the friction clutch 4 being too far closed due to imprecision in the calculation or estimation at the start of the method and thus a jerk movement of the motor vehicle being perceived.

In a further method step it is checked whether the friction clutch 4 is locking. If the friction clutch 4 locks, then the friction clutch 4 is not further closed because this closure would make no change to the then existing vehicle performance. If however the friction clutch 4 is still in a slip, then it is checked whether the friction clutch 4 was previously in a locking state. With a locking friction clutch 4 for example in the case of entering into a road incline and an associated increase in the driving resistance a clutch slip could again be produced. If such a situation is identified, the friction clutch 4 is then closed such that a steep clutch torque gradient is produced, the clutch torque is thus relatively quickly reduced. The friction torque 4 is thus rapidly made to lock again.

However, when the friction clutch 4 has not yet been in a locking state, it is checked in a further method step whether the motor vehicle is at a standstill. A vehicle standstill can be determined for example by means of a rotational speed sensor, a speed sensor or an acceleration sensor. A rotational speed sensor can for this purpose detect for example a gear input rotational speed or a gear output rotational speed, while a speed sensor can determine for example a front axle speed. If a vehicle standstill is detected, then the friction clutch 4 is activated further in the direction of "close". If the clutch torque transferred via the friction torque 4 is still below the driving resistance torque to be overcome, then the friction torque 4 is initially closed such that a steep clutch torque gradient is produced, because this driving resistance torque must firstly be overcome before the clutch torque transferred by the friction clutch 4 can affect the vehicle movement. If however the clutch torque transferred via the friction clutch 4 is greater than or the same as the driving resistance torque to be overcome, then the friction clutch 4 is closed such that a flat clutch torque gradient is produced, because the clutch torque transferred by the friction clutch 4 directly affects the vehicle movement.

If however it is determined in the previously mentioned method step that the motor vehicle is not at a standstill, then it is checked in a subsequent method step whether upon entry into the creep function "logic 2" a vehicle movement already existed and the clutch torque transferred via the friction clutch 4 is still below the driving resistance torque to be overcome. If such a situation is identified, then here too the friction coupling 4 is initially closed such that a steep clutch torque gradient is produced. If however such a situation does not exist, then it is checked whether the gear input rotational speed approximates the rotational speed of the drive unit 1. If such an approximation is detected, the friction clutch 4 is correspondingly closed more slowly, which results in a flatter clutch torque gradient being produced at the friction clutch 4. Thanks to this flatter clutch torque gradient a transition to a locking friction clutch can more easily take place. However if the gear input rotational speed does not approximate the rotational speed of the drive unit 1, then it is checked in a further method step whether a current vehicle acceleration exceeds a maximum permissible vehicle acceleration. If the maximum permissible vehicle acceleration is exceeded, this then indicates that a too high clutch torque is transferred via the friction clutch 4, In this case the current vehicle acceleration is decreased by means of slow opening of the friction clutch 4.

If however the current vehicle acceleration is within a permitted acceleration range and none of the previous conditions are met, then it is provided that the friction clutch 4 is closed such that an average clutch torque gradient is produced at the friction clutch 4.

The closing or opening of the friction clutch 4 can thus take place according to the satisfied condition with different clutch torque gradients. Due to the use of different clutch torque gradients, the friction clutch 4 can rapidly transfer the desired creep torque and a transition from a slipping friction clutch 4 to the locking state can nevertheless occur in a smooth manner, in other words without noticeable coupling jerks.

It is furthermore envisaged upon closure of the friction clutch 4 to limit both a clutch torque gradient and the clutch torque transferred via the friction clutch 4 to provided limit values. This is necessary because the friction clutch 4 can be operated only in a limited range during the creep mode in order to limit the load of the friction clutch 4 and thus the clutch wear.

Figure 7:
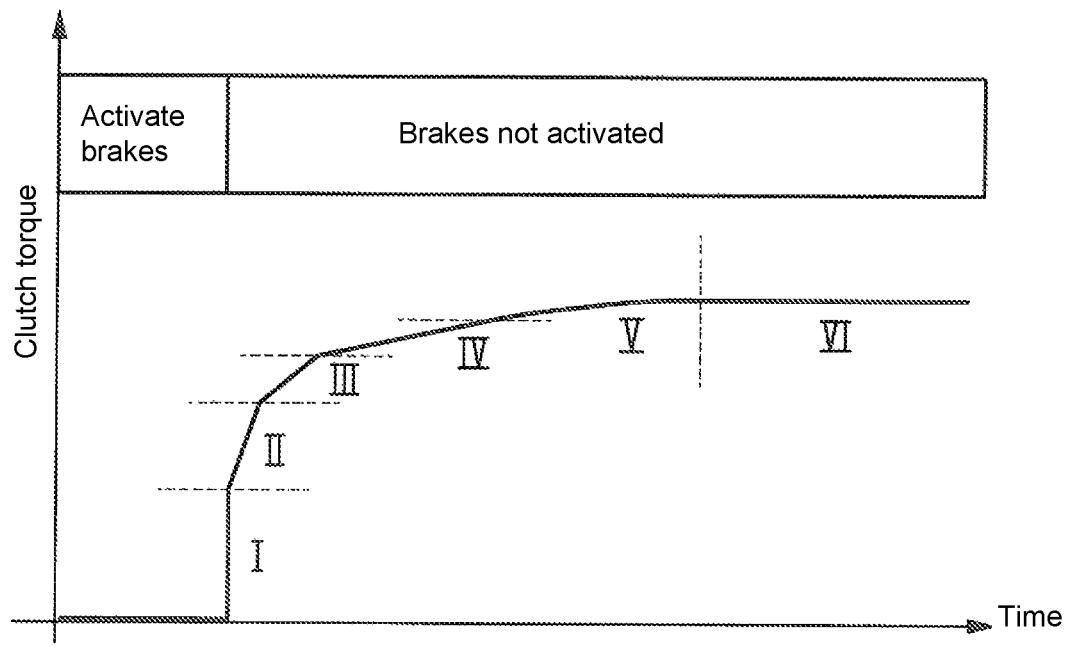
FIG. 7 shows a characteristic curve of clutch torque over time.

FIG. 7 depicts a progression of a clutch torque over time, which in the case of an activated second partial function "logic 2" provides the creep function for a creep out of the standstill. If the brake pedal 15 has been fully released by the vehicle driver, then firstly a leap is made to a clutch torque which lies slightly below the calculated clutch torque which is required for overcoming the driving resistance or the driving resistance torque. This is depicted by the characteristic line section I.

If during the method sequence of the second partial function it is determined that the motor vehicle is at a vehicle standstill, then the friction clutch 4 is further activated in the direction of "close". If the clutch torque transferred via the friction clutch 4 is still below the driving resistance torque to be overcome, then the friction clutch 4 is initially closed such that a steep clutch torque gradient is produced, because this driving resistance torque must firstly be overcome before the clutch torque transferred by the friction clutch 4 can affect the vehicle movement. This is depicted by the characteristic line section II.

Finally, if the clutch torque transferred via the friction clutch 4 is greater than or the same as the driving resistance torque to be overcome, then the friction clutch 4 is closed in such a way that a less steep clutch torque gradient is produced because the clutch torque transferred by the friction clutch 4 directly affects the vehicle movement. This is depicted by the characteristic line section III.

A characteristic line section IV follows the characteristic line section III, in which the still slipping friction clutch 4 is further closed with an average clutch torque gradient.

If the gear input rotational speed approximates the rotational speed of the drive unit 1, then the friction clutch 4 is closed in a correspondingly slower manner, as a result of which a flat clutch torque gradient is produced at the friction clutch 4 and a transition to a locking friction clutch 4 can take place in a simple manner. This is depicted by the characteristic line section V.

In the characteristic line section VI, the friction clutch 4 is finally in the locking state in which the friction clutch 4 is not further closed because this closure would make no change to the then existing vehicle behavior. Accordingly there is no further change of the clutch torque in the characteristic line section.

Figure 8:
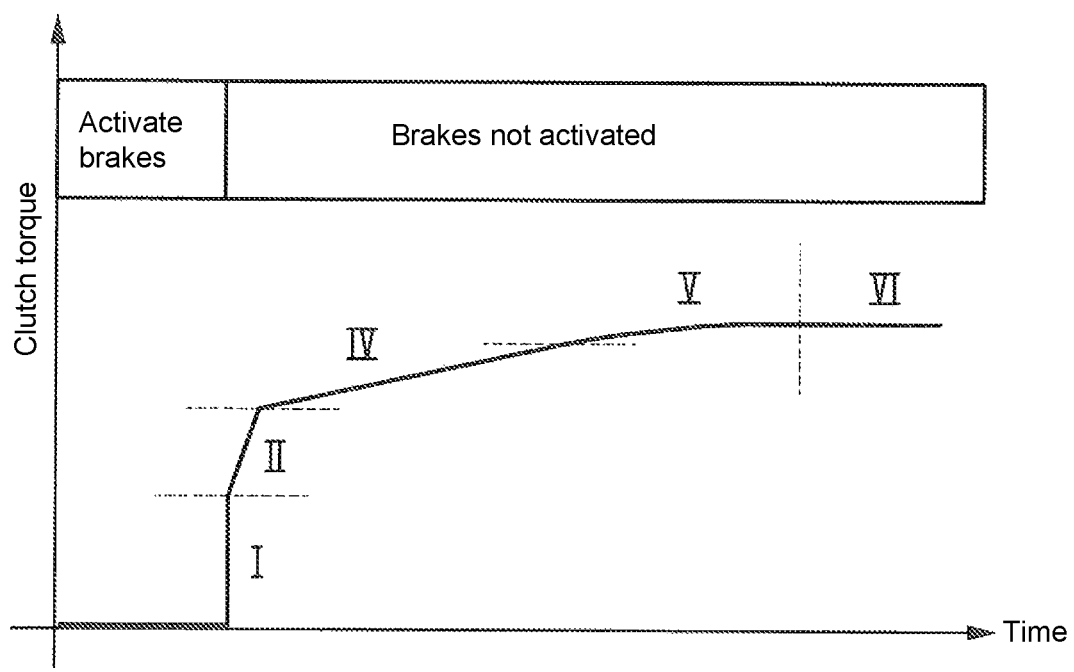
FIG. 8 shows a second characteristic curve of clutch torque over time.

FIG. 8 depicts a progression of a clutch torque over time, which in the case of an activated second partial function "logic 2" of the creep function is produced for a creeping in the case of an already rolling motor vehicle. Here too, a leap is initially made to a clutch torque which lies slightly below the calculated clutch torque which is required for overcoming the driving resistance or the driving resistance torque if the brake pedal 15 was fully released. This is depicted by the characteristic line section I.

If it is determined during the method sequence described in FIG. 6 that upon entry into the creep function "logic 2" a vehicle movement already existed and the clutch torque transferred via the friction clutch 4 is still below the driving resistance torque to be overcome, then the friction clutch 4 is initially closed such that a steep clutch torque gradient is produced. This is depicted by the characteristic line section II.

The characteristic line section II is followed by a characteristic line section IV, in which the still slipping friction clutch 4 is further closed with an average clutch torque gradient. If the gear input rotational speed approximates the rotational speed of the drive unit 1, then the friction clutch 4 is closed correspondingly slower, as a result of which a flat clutch torque gradient is produced at the friction clutch 4 and a transition to a locking friction clutch 4 can occur in a simple manner. This is depicted by the characteristic line section V.

In the characteristic line section VI the friction clutch 4 is finally in the locking state in which the friction clutch 4 is not further closed because this closure would make no change to the then present vehicle behavior. Accordingly no further change of the clutch torque takes place in the characteristic line section.

REFERENCE NUMERALS

1 Drive unit
2 Gear mechanism
3 Output
4 Friction clutch
5 Motor control device
6 Gear control device
7 Data
8 Data
9 Data
10 Data
11 Data
12 Data
13 Data
14 Accelerator pedal
15 Brake pedal
16 Data

The invention claimed is:

1. A method for controlling a creep mode of a motor vehicle with a drive train having a drive unit, a gear mechanism and a friction clutch arranged between the drive unit and the gear mechanism, in which a creep function for controlling the creep mode comprises a first partial function for controlling the creep mode in a case of an activated brake pedal and a second partial function for controlling the creep mode in a case of a non-activated brake pedal, the method comprising:
   only activating the first partial function of the creep function once the second partial function of the creep function has been activated; and
   activating the first partial function and deactivating the second partial function when the brake pedal is moved from a non-activated position to a position which lies between the non-activated position and a predefined threshold value of the brake pedal position or of a braking pressure.

2. The method according to claim 1, further comprising activating the second partial function when at least the drive unit is operating, a gear is engaged in the gear mechanism and an accelerator pedal and the brake pedal are not activated.

3. The method according to claim 1, further comprising, in a case of an activated first partial function of the creep function, determining creep torque transferred via the friction clutch from a characteristics map depending on a brake pedal activation and a driving resistance.

4. The method according to claim 1, further comprising, in a case of a first activation of the second partial function of the creep function, moving the friction clutch to a position in which a creep torque is transferred, via the friction clutch, which is slightly smaller than a clutch torque required for creeping of the motor vehicle.

5. The method according to claim 1, further comprising when the friction clutch is engaged by either the first or the second partial function of the creep function to such an extent that the friction clutch is in a locking state and neither an accelerator pedal nor the brake pedal is activated, moving the friction clutch by a certain amount further in an engaging direction and operating the drive unit via an idling rotational speed regulation.

6. The method according to claim 5, further comprising ending the idling rotational speed regulation of the drive unit when one of:
   either a brake pedal activation or an accelerator pedal activation is detected;
   a safety-critical driving mode is initiated; or
   a maximum permissible motor load is either reached or exceeded.

7. A control device for controlling a creep mode of a motor vehicle comprising at least a reception interface, which is designed to receive input signals from drive train components, an analysis unit to analyze either the received input signals or information from the received input signals, and a sending interface to emit control signals to the drive train components, the control device being designed to control the creep mode of the motor vehicle by a creep function,
   wherein the control device only enables a first partial function for controlling the creep mode, in a case of an activated brake pedal, when previously a second partial function for controlling the creep mode, in a case of a non-activated brake pedal, has been activated by the control device, and
   the control device enabling activation of the first partial function and deactivation of the second partial function when the brake pedal is moved from a non-activated position to a position which lies between the non-activated position and a predefined threshold value of the brake pedal position or of a braking pressure.

8. The control device according to claim 7, wherein the motor vehicle having a drive train having a drive unit, a gear mechanism and a friction clutch arranged between the drive unit and the gear mechanism, the control device carrying out a method for controlling a creep mode of the motor vehicle, in which the creep function for controlling the creep mode comprises the first partial function for controlling the creep mode, in the case of the activated brake pedal, and the second partial function for controlling the creep mode, in the case of the non-activated brake pedal, the first partial function of the creep function only being activated once the second partial function of the creep function is activated.

9. A computer program product with program code means, which are stored on a computer-readable medium to carry out a method for controlling a creep mode of a motor vehicle when the computer program product is executed on either a computer or a control device of the motor vehicle with a drive train having a drive unit, a gear mechanism and a friction clutch arranged between the drive unit and the gear mechanism, in which a creep function for controlling the creep mode comprises a first partial function for controlling the creep mode, in a case of an activated brake pedal, and a second partial function for controlling the creep mode, in a case of a non-activated brake pedal, the method comprising only activating the first partial function of the creep function once the second partial function of the creep function is activated, and activating the first partial function and deactivating the second partial function when the brake pedal is moved from a non-activated position to a position which lies between the non-activated position and a predefined threshold value of the brake pedal position or of a braking pressure, the computer or the control device having a reception interface, which is designed to receive input signals from drive train components, an analysis unit to analyze either the received input signals or information from the received input signals, and a sending interface to emit control signals to the drive train components, the control device being designed to control the creep mode of the motor vehicle by the creep function, the control device only enabling the first partial function for controlling the creep mode in the case of the activated brake pedal when previously the second partial function for controlling the creep mode in the case of the non-activated brake pedal has been activated by the control device.

\* \* \* \* \*